(12) United States Patent
Gzara et al.

(10) Patent No.: US 10,422,221 B2
(45) Date of Patent: Sep. 24, 2019

(54) FORMATION EVALUATION USING STOCHASTIC ANALYSIS OF LOG DATA (71) Applicant: Schlumberger Technology Corporation, Sugar Land, TX (US)

(72) Inventors: Kais Gzara, Tunis (TN); Vikas Jain, Sugar Land, TX (US); Chanh Cao Minh, Katy, TX (US); Roger Griffiths, Selangor (MY)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 429 days.

(21) Appl. No.: 15/021,079

(22) PCT Filed: Sep. 16, 2014

(86) PCT No.: PCT/US2014/055842
§ 371 (c)(1),
(2) Date: Mar. 10, 2016

(87) PCT Pub. No.: WO2015/039090
PCT Pub. Date: Mar. 19, 2015

(65) Prior Publication Data
US 2016/0230548 A1 Aug. 11, 2016

Related U.S. Application Data (60) Provisional application No. 61/878,487, filed on Sep. 16, 2013.

(51) Int. Cl.
*E21B 49/08* (2006.01)
*E21B 49/00* (2006.01)
(Continued)

(52) U.S. Cl.
CPC ............ *E21B 49/087* (2013.01); *E21B 49/00* (2013.01); *G01V 3/32* (2013.01); *G01V 11/002* (2013.01); *E21B 2049/085* (2013.01)

(58) Field of Classification Search
CPC ..................................................... E21B 49/087
See application file for complete search history.

(56) References Cited

U.S. PATENT DOCUMENTS

2005/0194134 A1* 9/2005 McGregor ............ E21B 49/006
166/264
2008/0082270 A1 4/2008 Heaton et al.
(Continued)

FOREIGN PATENT DOCUMENTS

WO 2015039090 A1 3/2015

OTHER PUBLICATIONS

International Search Report and the Written Opinion for International Application No. PCT/US2014/055842 dated Dec. 23, 2014.

*Primary Examiner* — Yu-Hsi D Sun (57) ABSTRACT

A method for determining a volume of a constituent(s) in a geological formation may include generating an equation of state based upon log measurements for the geological formation, with the equation of state providing a correlation between the log measurements, determining a quality factor for the equation of state, and for each of a plurality of different constituents expected to be in the formation, determining a constituent compliance factor for each of the constituents. The method may further include determining an uncertainty for each constituent compliance factor, determining a likelihood that each constituent is present in the formation based upon the quality factor, the constituent compliance factor for the constituent, and the uncertainty for the constituent compliance factor, generating a volumetric model based upon the log measurements and the determined
(Continued)

likelihoods of the constituents in the formation, and determining the volume of the constituent(s) based upon the volumetric model.

26 Claims, 7 Drawing Sheets

(51) Int. Cl.
*G01V 3/32* (2006.01)
*G01V 11/00* (2006.01)

(56) References Cited

U.S. PATENT DOCUMENTS

| | | |
|---|---|---|
| 2010/0305882 A1 | 12/2010 | Gysling |
| 2011/0088895 A1 | 4/2011 | Pop et al. |
| 2013/0090855 A1 | 4/2013 | Rasmus et al. |
| 2013/0112406 A1 | 5/2013 | Zuo et al. |
| 2013/0268201 A1 | 10/2013 | Gzara et al. |
| 2013/0338926 A1 | 12/2013 | Gzara et al. |

* cited by examiner

FORMATION EVALUATION USING STOCHASTIC ANALYSIS OF LOG DATA

CROSS-REFERENCE TO RELATED APPLICATION(S)

This application claims priority as a Patent Cooperation Treaty patent application of U.S. Provisional patent application Ser. No. 61/878,487 filed Sep. 16, 2013 with the same title.

BACKGROUND

1. Technical Field

The present disclosure relates generally to the field of well logging. More specifically, the subject matter of this disclosure relates to techniques for using log data for formation evaluation.

2. Background Information

This section is intended to introduce the reader to various aspects of art that may be related to various aspects of the subject matter described and/or claimed below. This discussion is believed to be helpful in providing the reader with background information to facilitate a better understanding of the various aspects of the present disclosure. Accordingly, it should be understood that these statements are to be read in this light, not as admissions of prior art.

Logging tools may be used in wellbores to make, for example, formation evaluation measurements to infer properties of the formations surrounding the borehole and the fluids in the formations. Common logging tools include electromagnetic tools, acoustic tools, nuclear tools, and nuclear magnetic resonance (NMR) tools, though various other tool types are also used.

Early logging tools were run into a wellbore on a wireline cable, after the wellbore had been drilled. Modern versions of such wireline (WL) tools are still used extensively. However, the need for real-time or near real-time information while drilling the borehole gave rise to measurement-while-drilling (MWD) tools and logging-while-drilling (LWD) tools. By collecting and processing such information during the drilling process, the driller may modify or correct key steps of the well operations to optimize drilling performance and/or well trajectory.

MWD tools typically provide drilling parameter information such as weight-on-bit, torque, shock and vibration, temperature, pressure, rotations-per-minute (rpm), mud flow rate, direction, and inclination. LWD tools typically provide formation evaluation measurements such as natural or spectral gamma ray, resistivity, dielectric, sonic velocity, density, photoelectric factor, neutron porosity, sigma thermal neutron capture cross-section (E), a variety of neutron induced gamma ray spectra, and nuclear magnetic resonance (NMR) distributions. MWD and LWD tools often have components common to wireline tools (e.g., transmitting and receiving antennas or sensors in general), but MWD and LWD tools may be constructed to not only endure but to operate in the harsh environment of drilling. The terms MWD and LWD are often used interchangeably, and the use of either term in this disclosure will be understood to include both the collection of formation and wellbore information, as well as data on movement and placement of the drilling assembly.

Logging tools may be used to determine formation volumetrics, that is, quantify the volumetric fraction, usually expressed as a percentage, of each and every constituent present in a given sample of formation under study. Formation volumetrics involves the identification of the constituents present, and the assigning of unique signatures for constituents on different log measurements. When, using a corresponding earth model, all of the forward model responses of the individual constituents are calibrated, the log measurements may be converted to volumetric fractions of constituents. Some examples of techniques for determining formation volumetrics are disclosed in U.S. patent application Ser. No. 13/837,409 (filed Mar. 15, 2013) and Ser. No. 13/836,651 (filed Mar. 15, 2013), both of which are commonly assigned.

In mature water flooded reservoirs, certain properties, such as formation water salinities, can vary considerably. If ignored, these variations can lead to erroneous water saturation ($S_w$) and high uncertainty in reserve calculations. Further, variations in water flooding salinities can alter some petrophysical parameters and can cause them to behave unexpectedly in some cases (i.e., in a non-Archie manner). Existing formation evaluation techniques in variable water salinity environments typically require accurate knowledge of at least some formation matrix and fluid petrophysical properties. However, in many real world applications, these properties may not always be available and, in some cases, are assumed and may not be accurate.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth in this section.

A method is for determining a volume of at least one constituent in a geological formation. The method may include generating an equation of state based upon log measurements for the geological formation, the equation of state providing a correlation between the log measurements, determining a quality factor for the equation of state, and for each of a plurality of different constituents expected to be in the formation, determining a constituent compliance factor for each of the constituents. The method may further include determining an uncertainty for each constituent compliance factor, determining a likelihood that each constituent is present in the formation based upon the quality factor, the constituent compliance factor for the constituent, and the uncertainty for the constituent compliance factor, generating a volumetric model based upon the log measurements and the determined likelihoods of the constituents being present in the formation, and determining the volume of the at least one constituent based upon the volumetric model.

A related logging system may include at least one logging tool to collect log measurements for a geological formation and a processor. The processor may generate an equation of state based upon the log measurements, the equation of state providing a correlation between the log measurements, determine a quality factor for the equation of state, and for each of a plurality of different constituents expected to be in the formation, determine a constituent compliance factor for each of the constituents. The processor may also determine an uncertainty for each constituent compliance factor, determine a likelihood that each constituent is present in the formation based upon the quality factor, the constituent compliance factor for the constituent, and the uncertainty for the constituent compliance factor, generate a volumetric model based upon the log measurements and the determined likelihoods of the constituents being present in the formation, and determine the volume of the at least one constituent based upon the model.

A related non-transitory computer-readable medium may have computer-executable instructions for causing a computer to at least generate an equation of state based upon log measurements for a geological formation, with the equation of state providing a correlation between the log measurements determine a quality factor for the equation of state, and for each of a plurality of different constituents expected to be in the formation, determine a constituent compliance factor for each of the constituents. The computer may also determine an uncertainty for each constituent compliance factor, determine a likelihood that each constituent is present in the formation based upon the quality factor, the constituent compliance factor for the constituent, and the uncertainty for the constituent compliance factor, generate a volumetric model based upon the log measurements and the determined likelihoods of the constituents being present in the formation, and determine the volume of the at least one constituent based upon the model.

A method for determining formation wettability includes acquiring joint NMR measurements, and at least one of dielectric, sigma ($\Sigma$) or carbon/oxygen (C/O) measurements, establishing an equation of state (EOS) for the log measurements, wherein the equation of state provides a correlation between the log measurements, using the equation of state to tell apart the water from the hydrocarbon fluid contributions to NMR aggregate distributions, and using such underpinning water and hydrocarbon fluid NMR distributions to infer hydrocarbon type or formation matrix wettability.

Again, the brief summary presented above is intended to familiarize the reader with certain aspects and contexts of embodiments of the present disclosure without limitation to the claimed subject matter.

BRIEF DESCRIPTION OF DRAWINGS

The present disclosure is best understood from the following detailed description when read with the accompanying figures. It is emphasized that, in accordance with standard practice in the industry, various features are not necessarily drawn to scale. In fact, the dimensions of various features may be arbitrarily increased or reduced for clarity of discussion.

DETAILED DESCRIPTION

One or more specific embodiments of the present disclosure are described below. These embodiments are merely examples of the presently disclosed techniques. Additionally, in an effort to provide a concise description of these embodiments, all features of an actual implementation may not be described in the specification. It should be appreciated that in the development of any such implementation, as in any engineering or design project, numerous implementation-specific decisions are made to achieve the developers' specific goals, such as compliance with system-related and business-related constraints, which may vary from one implementation to another. Moreover, it should be appreciated that such development efforts might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The embodiments discussed below are intended to be examples that are illustrative in nature and should not be construed to mean that the specific embodiments described herein are necessarily preferential in nature. Additionally, it should be understood that references to "one embodiment" or "an embodiment" within the present disclosure are not to be interpreted as excluding the existence of additional embodiments that also incorporate the recited features.

As briefly described above, in mature water flooded reservoirs, formation water salinities may not be uniform along a drilled borehole. For example, this non-uniformity may be the result of fresh injection water mixing with saline connate water over a period of time. The injection of fresh water is sometimes necessary to maintain reservoir pressure and to better sweep the hydrocarbon oil in place. If ignored, these variations can lead to erroneous water saturation ($S_w$) and can cause petrophysical parameters to behave unexpectedly (e.g., in a non-Archie manner). This can result in high uncertainty in hydrocarbon reserve calculations.

Many current formation evaluation techniques in variable water salinity environments require some of the matrix and fluids petrophysical properties to be available and accurate. For example, some known formation evaluation techniques in variable water salinity environments include: (1) carbon/oxygen techniques (known as C/O techniques) that are based on the ratio of carbon to oxygen yields using neutron inelastic scattering spectra; (2) resistivity/sigma ($\Sigma$) techniques that integrate resistivity and sigma measurements to solve simultaneously for water volume and water salinity; (3) nuclear LWD time-lapse data acquisition techniques that analyze the composition of the fraction of formation native fluids displaced by drilling mud-filtrate between two passes (i.e., this technique can solve for water salinity, but not for water volume when considered alone); (4) nuclear magnetic resonance (NMR) based techniques that are generally insensitive to water salinity (i.e. can solve for water volume, but cannot solve for water salinity when considered alone), and rely on assigning water and hydrocarbon(s) NMR signatures that are different from each other; and (5) dielectric based techniques that use a pair of measurements with one of them being insensitive to water salinity and the other one being very sensitive to water salinity, thereby allowing both water volume and water salinity to be solved. However, in many cases these properties are not necessarily available and when they are, may be assumed values rather than measured values.

The present disclosure provides various embodiments relating to a stochastic approach to estimate the variable water salinity in a continuous fashion from nuclear measurements alone, which does not require knowledge of the matrix petrophysical properties or the hydrocarbon petrophysical properties, and also eliminates various uncertainties related to resistivity equation and parameters selection. Thus, when compared to some of the existing prior art techniques for formation evaluation (listed above), embodiments disclosed herein may not require matrix lithology, hydrocarbon properties, resistivity response parameters (Archie parameters), or multiple passes.

Figure 1:
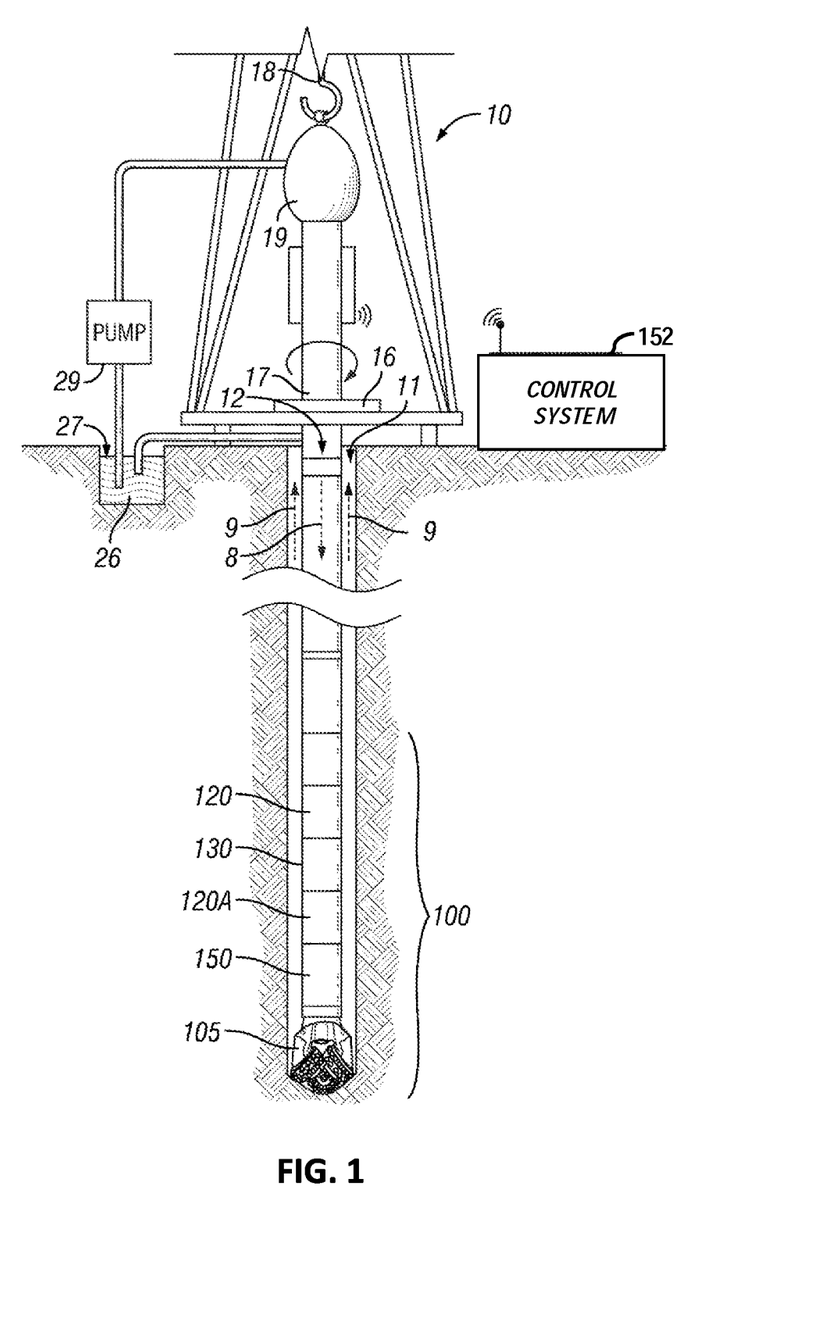
FIG. 1 is a schematic diagram of a wellsite system that may be used for implementation of an example embodiment.

Referring initially to FIG. 1, a simplified view of a well site system in which various embodiments can be employed is illustrated. The well site system depicted in FIG. 1 can be deployed in either onshore or offshore applications. In this type of system, a borehole 11 is formed in subsurface formations by rotary drilling in a manner that is well known to those skilled in the art. Some embodiments can also use directional drilling.

A drill string 12 is suspended within the borehole 11 and has a bottom hole assembly (BHA) 100 which includes a drill bit 105 at its lower end. The surface system includes a platform and derrick assembly 10 positioned over the borehole 11, with the assembly 10 including a rotary table 16, kelly 17, hook 18 and rotary swivel 19. In a drilling operation, the drill string 12 is rotated by the rotary table 16 (energized by means not shown), which engages the kelly 17 at the upper end of the drill string. The drill string 12 is suspended from a hook 18, attached to a traveling block (also not shown), through the kelly 17 and a rotary swivel 19 which permits rotation of the drill string 12 relative to the hook 18. A top drive system could be used in other embodiments.

In the illustrated example, the surface system further illustratively includes drilling fluid or mud 26 stored in a pit 27 formed at the well site. A pump 29 delivers the drilling fluid 26 to the interior of the drill string 12 via a port in the swivel 19, which causes the drilling fluid 26 to flow downwardly through the drill string 12, as indicated by the directional arrow 8. The drilling fluid exits the drill string 12 via ports in the drill bit 105, and then circulates upwardly through the annulus region between the outside of the drill string 12 and the wall of the borehole, as indicated by the directional arrows 9. In this known manner, the drilling fluid lubricates the drill bit 105 and carries formation cuttings up to the surface as it is returned to the pit 27 for recirculation.

The bottom hole assembly (BHA) 100 of the illustrated embodiment includes a logging-while-drilling (LWD) module 120, a measuring-while-drilling (MWD) module 130, a rotary-steerable system and motor, and drill bit 105. As used herein, the term "module" as applied to MWD and LWD devices is understood to mean either a single tool or a suite of multiple tools contained in a single modular device. Additionally, the BHA 100 includes a rotary steerable system (RSS) and motor 150 and a drill bit 105.

The LWD modules 120 may be housed in a drill collar and can include one or more types of logging tools. The LWD modules 120 may include capabilities for measuring, processing, and storing information, as well as for communicating with the surface equipment. By way of example, the LWD module 120 may include one or more types of logging tools, such as a nuclear logging tool, and may include capabilities for measuring, processing, and storing information, and for communicating with surface equipment. In other embodiments, the LWD module 120 may include an NMR logging tool, an electromagnetic logging tool, or an acoustic logging tool, instead of or in addition to a nuclear logging tool.

The MWD module 130 is also housed in a drill collar, and can contain one or more devices for measuring characteristics of the drill string and drill bit. In the present embodiment, the MWD module 130 can include one or more of the following types of measuring devices: a weight-on-bit measuring device, a torque measuring device, a vibration measuring device, a shock measuring device, a stick/slip measuring device, a direction measuring device, and an inclination measuring device (the latter two sometimes being referred to collectively as a D&I package). The MWD tool 130 further includes an apparatus (not shown) for generating electrical power for the downhole system. For instance, power generated by the MWD tool 130 may be used to power the MWD tool 130 and the LWD tool(s) 120. In some embodiments, this apparatus may include a mud turbine generator powered by the flow of the drilling fluid 26. It is understood, however, that other power and/or battery systems may be employed.

In various embodiments, the systems and methods disclosed herein may be used with other conveyance approaches known to those of ordinary skill in the art. For example, the systems and methods disclosed herein may be used with tools or other electronics conveyed by wireline, slickline, drill pipe conveyance, coiled tubing drilling, and/or a while-drilling conveyance interface. For the purpose of an example only, FIG. 1 shows a while-drilling interface. However, systems and methods disclosed herein could apply equally to wireline or other suitable conveyance platforms.

The operation of the assembly 10 of FIG. 1 may be controlled using control system 152 located at the surface. The control system 152 may include one or more processor-based computing systems. In the present context, a processor may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for instance, workflows and the like for carrying out a drilling operation, algorithms and routines for processing data received at the surface from the BHA 100 (e.g., as part of an inversion to obtain one or more desired formation parameters), and so forth.

Figure 2:
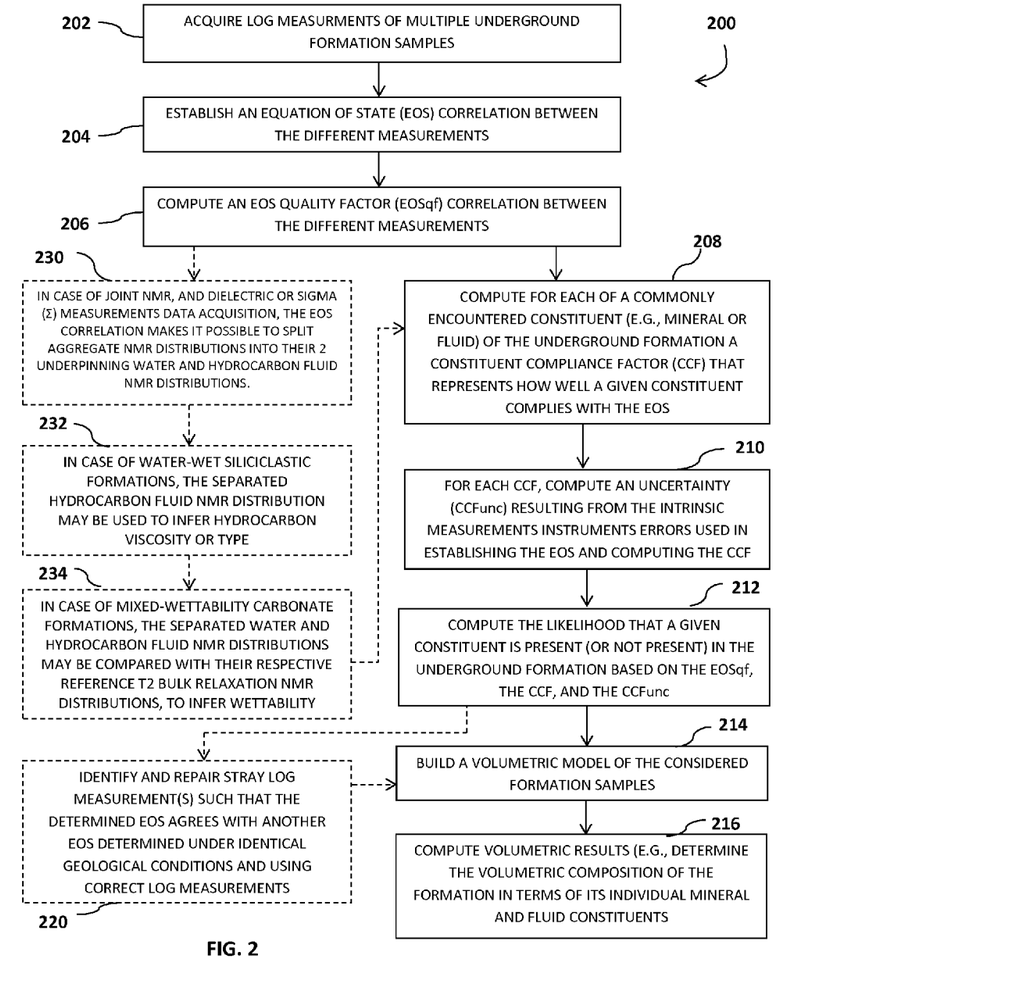
FIG. 2 shows a method for determining formation volumetric information in accordance with aspects of the present disclosure.

In particular, the control system 152 may include instructions that are adapted to perform the process shown in FIG. 2. FIG. 2 is an embodiment showing a method 200 for determining formation volumetric characteristics in accordance with aspects of the present disclosure. The method includes acquiring log measurements of multiple underground formation samples as shown at 202. As an example, the log measurements may be measurements acquired using a nuclear logging tool, such as one or more of natural gamma-ray measurements, bulk density measurements, neutron porosity measurements, and/or thermal-neutron capture cross-section (Sigma (Σ)) measurements. At 204, an equation of state (EOS) which provides a correlation between the different measurements acquired at 202 is established. More detailed examples of EOS's are discussed below. In some embodiments, the EOS may be determined using various techniques, such as principal component analysis (PCA) based on the rank of a log measurements correlation matrix.

Once the EOS is established, a quality factor (EOSqf) that represents a degree of correlation that was established by the EOS can be determined at 206. Then, the method 200 includes computing a constituent compliance factor (CCF) for each of any commonly encountered constituents in the underground formation at 208. The CCF represents (for a given constituent) how well that constituent complies with the EOS determined in 204. Further, as shown in 210, for each CCF, an uncertainty (CCFunc) resulting from the intrinsic errors in the measurement instruments used to establish the EOS and compute the CCF is determined. Then, at 212, the likelihood that a considered constituent is actually present (or not present) in the formation is determined based on the computed EOSqf, CCF, and CCFunc.

With respect to the details discussed with respect to 202-212, many applications and uses are possible using these described parameters. For instance, in a first example, when testing the EOS using water endpoint parameters, then it is expected that only water of the correct salinity will satisfy the EOS, allowing for the determination of water salinity. In a second example, when testing the EOS using hydrocarbon endpoint parameters, hydrocarbon types and composition may be narrowed down. In the case of hydrocarbons classified by API gravity alone, then it is expected that only hydrocarbons of the correct API gravity will satisfy the EOS, thus allowing for the determination of API gravity. In a third example, when testing the EOS using clay mineral endpoint parameters, clay type and composition can be narrowed down. This can allow for the determination of missing and/or variable clay petrophysical parameters from the ones available. In a fourth example, when testing the EOS in a siliciclastics sequence using, for example, quartz mineral endpoint parameters, then it is expected that only quartz of the correct radioactivity characteristics will satisfy the EOS, thus allowing for the assignment of a unique quartz gamma-ray endpoint. In a fifth example, when testing the EOS using anhydrite mineral endpoint parameters, it is expected that only anhydrite of the correct thermal neutron capture cross-section (E) will satisfy the EOS, thus allowing for the assignment of a unique anhydrite E endpoint. In a sixth example, when testing the EOS using well-known and/or fixed mineral endpoints (e.g., dolomite, limestone, quartz, etc.), then it is possible to validate or invalidate the presence of such minerals in the considered underground formation samples using the EOS, EOSqf, CCF, and CCFunc parameters. It is understood that the various examples of applications of the EOS, EOSqf, CCF, and CCFunc, as described above, are non-limiting examples.

Thereafter, in one embodiment, the method 200 continues to 214 and a volumetric petrophysical model of the considered formation samples is built. From the model, volumetric information of the formation is computed at 216.

In another embodiment, prior to building the volumetric petrophysical model at 214, the method 200 may include identifying and repairing stray log measurement(s), such that the determined EOS agrees with another EOS determined under identical geological conditions with correct log measurements prior to building the volumetric model (at 214) and computing volumetric information of the formation (at 216). For instance, where a stray log measurement is desired to be fixed and/or repaired using better/revised calibration parameters, then these additional calibration parameters may be determined as those that ensure that the EOS is honored, as determined separately using log measurements that are known to be correct. There are several possible applications and uses with respect to 220 of method 200. In one example, when the stray log measurement under consideration is a neutron-gamma density (NGD) measurement, gain ($a_1$) and offset ($a_0$), or linear combination parameters (a, b, c, d) may be optimized in a manner such that:

$$\begin{cases} NGD_{correct} = a_1 \ NGD + a_0 \\ \text{or} \\ NGD_{correct} = a \ NGD + b \ TNPH + c \ SIFA + d \end{cases}$$

causes the new data points to obey and satisfy an existing and/or pre-established EOS based on a separate set of correct measurement data, wherein TNPH means thermal neutron porosity measurement and SIFA means a thermal neutron capture cross-section (Sigma) formation average (SIFA) measurement.

In another example, because the formation matrix endpoint measurements, as derived from elemental spectroscopy measurements, are expected to inherently satisfy the EOS, then when the stray log measurements considered are elemental spectroscopy data, such as RHGE (meaning grain bulk density from the elements), SIGE (meaning grain thermal neutron capture cross-section (Sigma) from the elements), TNGE (meaning grain thermal neutron porosity from the measurements), UGE (meaning grain volumetric photo-electric factor from the elements) or PGE (meaning grain photo-electric factor from the elements), then the coefficients used to construct these log measurements from the computed yields may be optimized such that the revised data points satisfy an existing and/or pre-established EOS based on a separate set of correct measurement data.

Figure 3:
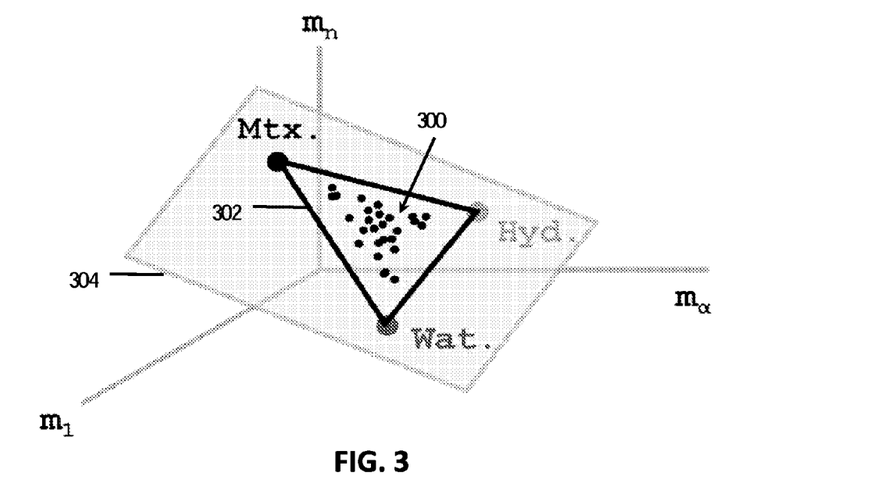
FIG. 3 shows multiple data points corresponding to different measurement types plotted in a multi-dimensional space.

A practical application of the method 200 of FIG. 2 is now shown with respect to FIGS. 3-11 described below. Specifically, these figures demonstrate an example for determining water salinity in a variable water salinity formation. Referring to FIG. 3 initially, this figure shows different axes ($m_1$, $m_\alpha$, and $m_n$), each representing one type of measurement. As an example, the measurements may represent multiple types of nuclear measurements, such as natural gamma-ray, bulk density, thermal neutron porosity, or sigma thermal neutron capture cross-section measurements. Every data point (represented by the points 300) represents multiple measurement readings and can then be plotted in this multi-dimensional space, using the measurements as coordinates. Assuming the geological formation under consideration consists of one mineral type (represented by Mtx), water (represented by Wat), and a hydrocarbon (represented by Hyd) then all the measurement data points 300 would fall within a triangle 302 having its vertices as the Mtx, Wat, and Hyd endpoints. Where each of the data point 300 plots will depend on the particular volumetric percentages of mineral, water, and hydrocarbon present in the geological sample. As can be seen in FIG. 3, this triangle 302 fits on a plane 304.

Figure 4:
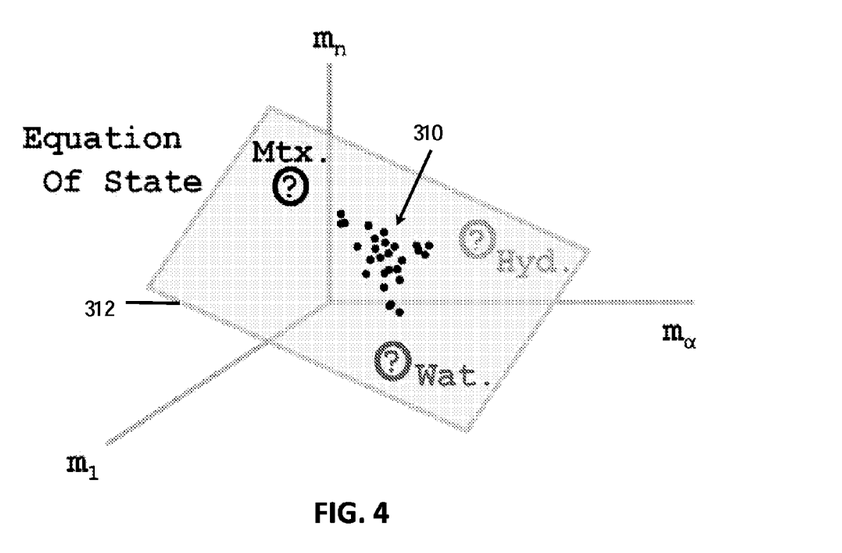
FIG. 4 shows the correlation of the data points from FIG. 3 to an equation of state (EOS).

FIG. 4 shows a situation in practice where the measurement data points are available, but the individual constituent endpoints (e.g., Mtx, Hyd, and Wat in FIG. 3) are not known beforehand. The data points 310 may then be correlated and may be found, for example, to fit on a plane 312. This correlation is referred to as an equation of state (EOS), as generally described above with reference to FIG. 2. The degree of correlation of the data, i.e. how well the measurement data points 310 adhere to the determined EOS, may be referred to as the equation of state quality factor (EOSqf).

Figure 5:
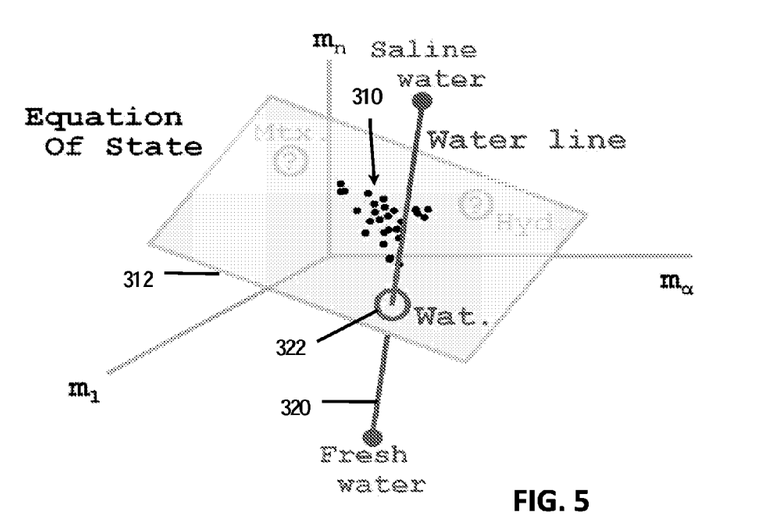
FIG. 5 shows an example in which water salinity is determined using the EOS from FIG. 4.

To show one application of the EOS (among many possible applications as above-described), FIG. 5 illustrates an example in how the water salinity can be determined in a relatively straightforward manner. For instance, if the term "Water Line" is introduced to refer to that curve 320 that spans from the fresh water endpoint (i.e., water with zero salinity) to a maximum salinity water endpoint (i.e., water with approximately 330 ppk salinity), then the point 322 where the Water Line satisfies the EOS can be selected as the correct water endpoint to use, and hence considered a determination of the correct water salinity.

Figure 6:
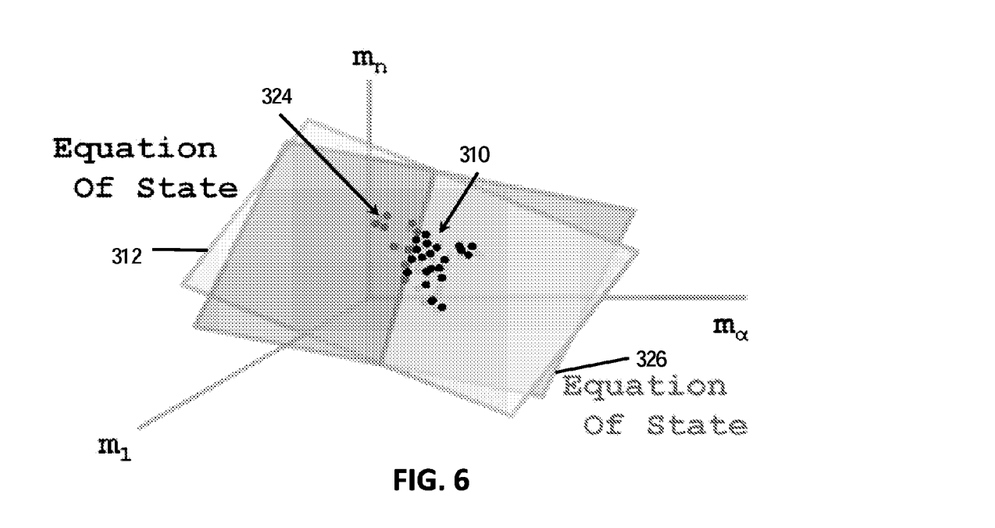
FIG. 6 shows how intrinsic errors in the measurement instruments can affect the EOS and how a new EOS (that takes intrinsic measurement errors into account) compares to the original EOS from FIG. 5.
Figure 7:
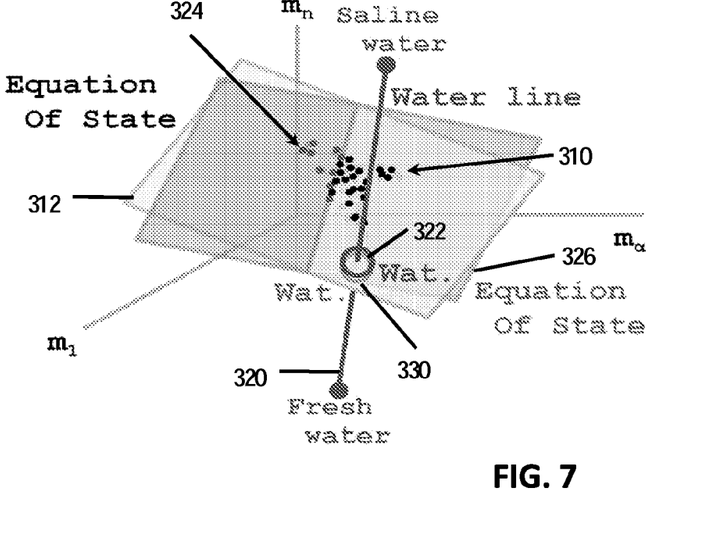
FIG. 7 illustrates how a new EOS (that takes intrinsic measurement errors into account) affects parameters being determined therefrom, as compared to the original EOS from FIG. 5.

FIGS. 6 and 7 shows how intrinsic error in the measurement instruments that acquired the measurements used to establish the EOS can affect the EOS and the determined water salinity. For instance, as shown in FIG. 6, the addition of measurement errors (data points 324 compared to the original data points 310) can result in a different EOS (plane 326 compared to the original plane 312). FIG. 7 shows the curve 320 representing changing water salinity, as referenced in FIG. 5. It can be seen that the new EOS (plane 326) results in a different water salinity (shown at point 330), since the Water Line curve 320 intersects the new EOS 326 at a different point than the original EOS (plane 312), which intersected with the Water Line curve at point 322.

Figure 8:
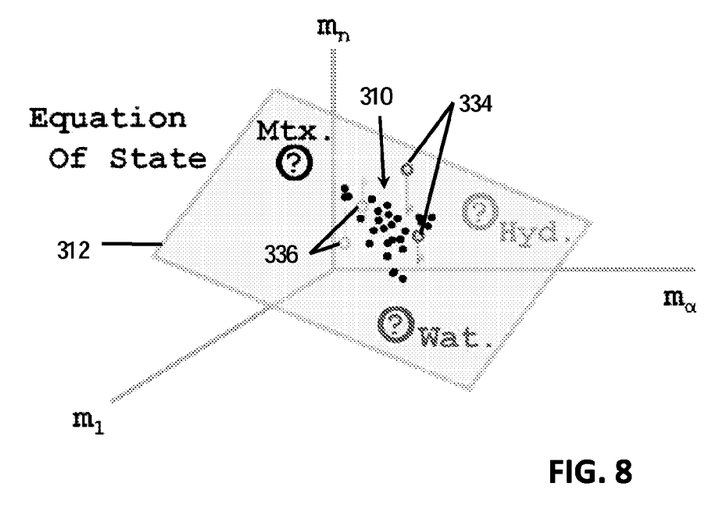
FIG. 8 illustrates an example of how a given EOS may be assigned a quality factor based on how well measurement data points correlate thereto.

FIG. 8 shows the same set of data points 310 from FIG. 5, but with additional data points that are distributed above (334) and below (336) the original EOS plane 312, and therefore do not fit well with the originally determined EOS. Thus, in this case, although the determined EOS is substantially the same, the EOS is assigned a lower quality factor (EOSqf). As discussed above, the EOSqf provides an indication of the degree of correlation established by the EOS.

Figure 9:
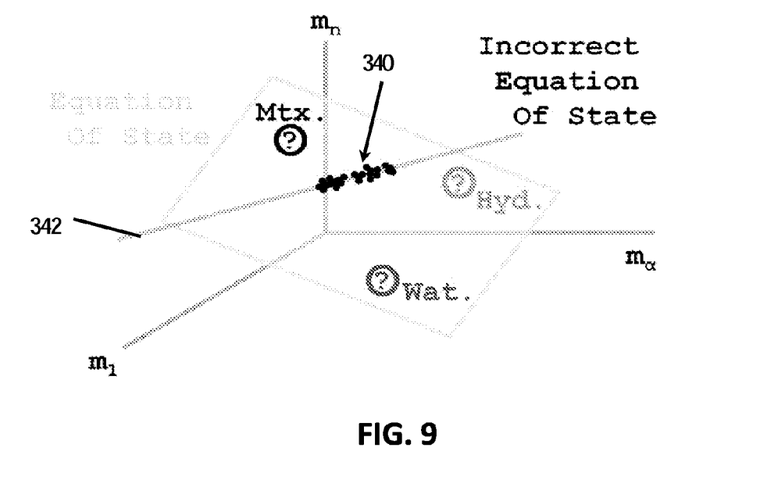
FIGS. 9 and 10 show erroneous EOS examples.
Figure 10:
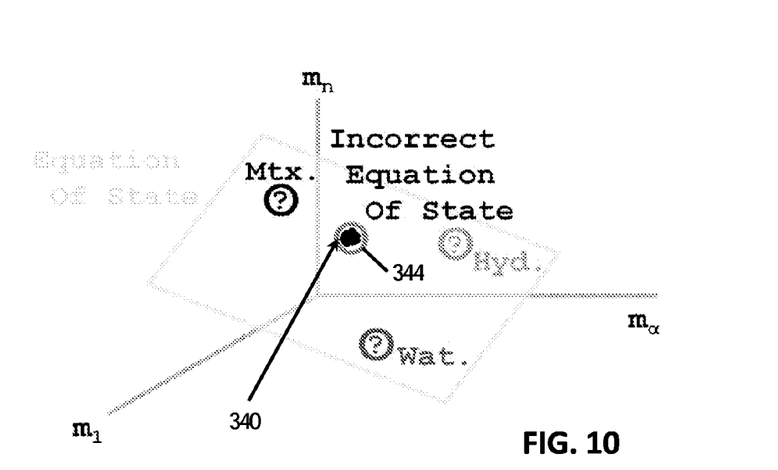

FIG. 9 shows a situation in which the EOS may be in error. For example, this may occur when the rank of the log measurements correlation matrix is less than the number of formation constituents present. As shown in this figure, the data points 340 are shown to cluster along a line 342 instead of being distributed in a plane (e.g., plane 312 in FIG. 5). FIG. 10 similarly shows a situation where the data points 340 are clustered around a single data point 344. This may be indicative that the geological formation surveyed is uniform and thus the log measurements exhibit very little variability. In the latter case, a correct EOS may be difficult (or impossible) to determine.

Figure 11:
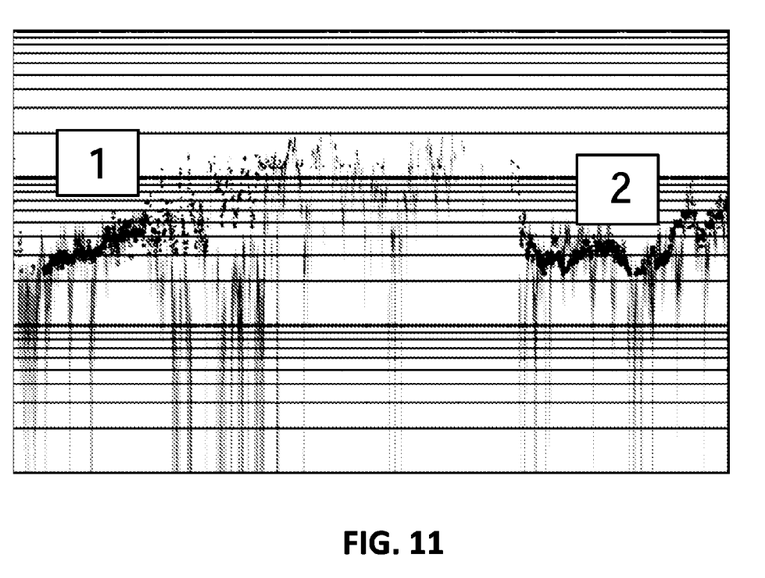
FIG. 11 is an example showing how the EOS technique was applied to determine water salinity in a variable water salinity environment, where water salinity was not uniform along a drilled borehole.

FIG. 11 shows an example of actual determined water salinity data, in a situation where water salinity was not uniform along the drilled borehole but changed as a result of fresh injection water mixing with saline connate water over a period of time. As can be appreciated, the injection of fresh water (or other liquids) is sometimes necessary to maintain reservoir pressure and better sweep the hydrocarbon oil in place. In the example shown in FIG. 11, an EOS was determined in a continuous fashion, in a sliding depth window 20 feet wide. A representative water salinity was then computed for each determined EOS. In the graph of FIG. 11, the horizontal axis represents measured depth along the borehole, and the vertical axis represents water thermal neutron capture cross-section (Σ), which is a proxy for water salinity.

The variable color/gray scale at any one depth represents the distribution of the determined water salinity using the techniques describes in the present disclosure. The black dots represent determined water salinity using other existing techniques, such as the resistivity/sigma joint inversion technique, as a benchmark. As can be seen, water salinity determined using both techniques is rather consistent (zones labeled 1 and 2). A transparency mask was superimposed upon the graph, as modulated by the EOSqf, in order to exclude intervals where confidence in the EOS was low.

As discussed above, certain existing formation evaluation techniques for determining formation volumetric information may require knowledge of certain petrophysical properties of a formation matrix and/or formation fluids. However, in many cases, such properties are not necessarily available and when they are, may be assumed values rather than measured values.

Referring again to FIG. 2, in another embodiment, when the measurements include NMR together with a at least one of dielectric, sigma thermal neutron capture cross-section (Σ) or carbon/oxygen (C/O) measurements 230, then the established EOS can be used to breakdown aggregate NMR distributions into separate water and hydrocarbon fluid contributions. Such underpinning water and hydrocarbon fluid contributions depend on both hydrocarbon viscosity and formation matrix wettability, and may therefore be used to compute them. For example, if we represent water volume from the dielectric measurement as $VW_{dielectric}$, and if we label the components of an aggregate NMR distribution as:

$$NMR_{distribution} = \begin{pmatrix} NMR_1 \\ NMR_2 \\ ... \\ NMR_J \end{pmatrix}$$

then the equation of state (EOS) may be formulated as:

$$p_1 NMR_1 + p_2 NMR_2 + \ldots + p_J NMR_J = VW_{dielectric}$$

The EOS parameters $p_1, p_2, \ldots p_J$ in this expression, in fact, primarily represent the water fraction associated with each of the NMR distribution components. Aggregate NMR distributions may then be split into separate water and hydrocarbon fluid contributions as:

$$NMR_{distribution} = NMR_{water} + NMR_{hydrocarbons}$$

where $$NMR_{water} = \begin{pmatrix} p_1 NMR_1 \\ p_2 NMR_2 \\ ... \\ p_J NMR_J \end{pmatrix} \quad NMR_{hydrocarbon} = \begin{pmatrix} (1-p_1) NMR_1 \\ (1-p_2) NMR_2 \\ ... \\ (1-p_J) NMR_J \end{pmatrix}$$

In water-wet formations, the water NMR T2 contribution will relax faster than the theoretical reference water T2 bulk relaxation time, and the hydrocarbon oil NMR T2 contribution will relax at its theoretical reference hydrocarbon oil T2 bulk relaxation time; whereas in oil-wet formations, the water NMR T2 contribution will relax at the theoretical reference water T2 bulk relaxation time, and the hydrocarbon oil NMR T2 contribution will relax faster than the theoretical reference hydrocarbon oil T2 bulk relaxation time. The more viscous the hydrocarbon oil, the faster the T2 bulk relaxation time. Therefore, the above methods may be used to infer wettability in carbonate formations, and hydrocarbon oil viscosity in siliciclastic formations 232, 234.

The embodiments and technique described in this disclosure relate to a stochastic approach to estimate the variable water salinity in a continuous fashion from nuclear measurements alone, which does not require knowledge of the matrix petrophysical properties or the hydrocarbon petrophysical properties, and also eliminates or reduces various uncertainties related to resistivity equation and parameters selection. Thus, when compared to some of the existing prior art techniques for formation evaluation (listed above), embodiments disclosed herein may not require matrix lithology, hydrocarbon properties, resistivity response parameters (Archie parameters), or multiple passes.

As described above with reference to FIGS. 2-11, embodiments of the techniques described herein presume that an equation of state (EOS) type correlation tying all the log measurements may be established from log data measurements alone. This EOS may then be determined using any suitable mathematical processing or transform, such as principal component analysis (PCA) based on the rank of the log measurements correlation matrix. This EOS will also typically provide that the number of log measurements available equals or exceeds the number of elemental formation constituents that make up the geological formation. In one embodiment, the EOS can be typically expressed as:

$$P(\vec{M}) = \vec{0} \tag{1}$$

Where P stands for a linear transformation (i.e. a matrix), and $$\vec{M} = \begin{pmatrix} m_1 \\ m_\alpha \\ m_n \\ 1 \end{pmatrix} \tag{2}$$

is a vector that has all the "n" log measurements $m_1 \ldots m_n$ as its components, and where the last component of M is equal to 1.

Because the vectors $\vec{M}^{(d)}$ at any depth location "d" along the borehole, are typically a volumetric linear combination of the $\vec{M}_i$ representing the "N" different formation constituents taken individually, which can be expressed as:

$$\vec{M}^{(d)} = \sum_{i=1}^{i=M} v_i^{(d)} \vec{M}_i \tag{3}$$

where the coefficients $v_i^{(d)}$ represent the volumetric fraction of the "N" different formation constituents.

Then, it follows that for all "d":

$$(\vec{M}^{(d)}) = \vec{0} = \sum_{i=1}^{i=N} v_i^{(d)} P(\vec{M}_i) \tag{4}$$

This typically represents an over-determined system of equations with $P(\vec{M}_i)$ as unknowns, which can then be expressed symbolically as:

$$K \begin{pmatrix} P(\vec{M}_1) \\ P(\vec{M}_i) \\ P(\vec{M}_N) \end{pmatrix} = \begin{pmatrix} \vec{0} \\ \vec{0} \\ \vec{0} \end{pmatrix} \tag{5}$$

where the matrix "K" stands for:

$$K = \begin{pmatrix} v_1^{(\Delta)} & v_i^{(\Delta)} & v_N^{(\Delta)} \\ v_1^{(d)} & v_i^{(d)} & v_N^{(d)} \\ v_1^{(D)} & v_i^{(D)} & v_N^{(D)} \end{pmatrix} \tag{6}$$

and depth "d" varies from "Δ" to "D".

It may also be alternatively expressed in more conventional mathematical form as:

$$K \begin{pmatrix} {}^T P(\vec{M}_1) \\ {}^T P(\vec{M}_i) \\ {}^T P(\vec{M}_N) \end{pmatrix} \equiv K \begin{pmatrix} {}^T \vec{M}_1 \\ {}^T \vec{M}_i \\ {}^T \vec{M}_N \end{pmatrix} {}^T P = \begin{pmatrix} 0 & 0 & 0 \\ 0 & 0 & 0 \\ 0 & 0 & 0 \end{pmatrix} \tag{7}$$

When we further consider the constituents' volumetric percentages at different depth to be uncorrelated amongst each other, we may express this as:

$$^T K \, K \begin{pmatrix} P(\vec{M}_1) \\ P(\vec{M}_i) \\ P(\vec{M}_N) \end{pmatrix} = {}^T K \begin{pmatrix} \vec{0} \\ \vec{0} \\ \vec{0} \end{pmatrix} = \begin{pmatrix} \vec{0} \\ \vec{0} \\ \vec{0} \end{pmatrix} \tag{8}$$

or $$Corr_{Vol} \begin{pmatrix} P(\vec{M}_1) \\ P(\vec{M}_i) \\ P(\vec{M}_N) \end{pmatrix} = \begin{pmatrix} \vec{0} \\ \vec{0} \\ \vec{0} \end{pmatrix} \tag{9}$$

where:

$$Corr_{Vol} = {}^T \begin{pmatrix} v_1^{(\Delta)} & v_i^{(\Delta)} & v_N^{(\Delta)} \\ v_1^{(d)} & v_i^{(d)} & v_N^{(d)} \\ v_1^{(D)} & v_i^{(D)} & v_N^{(D)} \end{pmatrix} \begin{pmatrix} v_1^{(\Delta)} & v_i^{(\Delta)} & v_N^{(\Delta)} \\ v_1^{(d)} & v_i^{(d)} & v_N^{(d)} \\ v_1^{(D)} & v_i^{(D)} & v_N^{(D)} \end{pmatrix} \tag{10}$$

is the correlation matrix of the different constituents' volumes over the depth interval of interest.

However, it should be noted that when this matrix is not singular, then all the $P(\vec{M}_i)$ for all the constituents will be $\vec{0}$ according to:

$$\begin{pmatrix} P(\vec{M}_1) \\ P(\vec{M}_i) \\ P(\vec{M}_N) \end{pmatrix} = Corr_{Vol}^{inv} \begin{pmatrix} \vec{0} \\ \vec{0} \\ \vec{0} \end{pmatrix} = \begin{pmatrix} \vec{0} \\ \vec{0} \\ \vec{0} \end{pmatrix} \tag{11}$$

Hence, all the individual constituents' measurements endpoints must comply with the established EOS.

From a practical point of view, the rank of the log measurements $\vec{M}$ correlation matrix $Corr_{Logs}$, can be used to infer whether the correlation matrix $Corr_{vol}$ is singular or not. This may be done, for example, by requiring the rank of $Corr_{Logs}$ to correspond to the number of formation constituents present in order to consider that $Corr_{vol}$ is not singular. Mud logging, elemental spectroscopy data, or formation fluid testing data, to name just a few examples, may be used to infer the effective number of formation constituents present.

The expression "effective" number of formation constituents present, is introduced here to allow for the case where the composition of the matrix includes a mixture of many minerals in fixed ratios or where the composition of the porosity includes a mixture of many fluids in a fixed ratio, as may be desired when testing the EOS with either only fluid measurements endpoints or only minerals measurement endpoints, respectively. For instance, if minerals in the matrix are in a fixed ratio, such as 30% limestone and 70% dolomite to provide an example, then neither the limestone or dolomite endpoints would satisfy the EOS. However, the fluid endpoints can still be tested against the EOS. The reverse is also true, that if certain fluids are in a fixed ratio, those fluid endpoints may not satisfy the EOS, but the mineral endpoints can still be tested against the EOS.

In a case where the log measurements available are sensitive to the matrix minerals (e.g., elemental spectroscopy measurements) and to the fluids present in the pores (e.g., mud logging measurements), then the rank of the measurements correlation matrices taken separately (e.g. correlation matrix of spectral measurements alone) can be used to qualify the validity of the EOS. How close the correlation matrix is close to being singular, and how well the measurement data points fit the established EOS, is expressed as an equation of state quality factor (EOSqf) as described above.

To provide an example, because water is considered one of the constituents generally always present in geological formations, the established EOS may be tested using various water measurement endpoints. However, only water of the correct salinity would satisfy the EOS (shown in FIG. 5). Thus, this provides a way to determine the correct water salinity by solving for $$P(\vec{M}_{Water}(\text{Salinity}))=\vec{0} \qquad (12)$$

where $\vec{M}_{water}$ is considered a function of "Salinity", and "Salinity" is the unknown to be solved.

The resulting "Salinity", is also assigned an error range, determined based on the intrinsic error of the measurement instruments acquiring the measurements used to establish the EOS. In the following detailed example, it is assumed that 2 minerals and 2 fluids are present in a geological formation (sandstone "ss", clay "cl", hydrocarbon "H" and water "W"). The four log measurements considered are natural gamma-ray ($G_{log}$), bulk density ($D_{log}$), neutron porosity (($p_{log}$), and sigma thermal-neutron capture cross-section ($\Sigma_{log}$). Because these measurements have different measurement units, they are construed in the following to have been normalized by the intrinsic error of the respective measurement instruments used. The EOS that is expected in this case, is of the form:

$$gG_{log}+dD_{log}+f\varphi_{log}+s\Sigma_{log}+1=0 \qquad (13)$$

where g, d, f and s are all constant parameters that define the EOS.

These parameters can be determined according to the over-determined system of equations:

$$g\begin{pmatrix}G_{log}^{(\Delta)}\\G_{log}^{(d)}\\G_{log}^{(D)}\end{pmatrix}+d\begin{pmatrix}D_{log}^{(\Delta)}\\D_{log}^{(d)}\\D_{log}^{(D)}\end{pmatrix}+f\begin{pmatrix}\varphi_{log}^{(\Delta)}\\\varphi_{log}^{(d)}\\\varphi_{log}^{(D)}\end{pmatrix}+s\begin{pmatrix}\Sigma_{log}^{(\Delta)}\\\Sigma_{log}^{(d)}\\\Sigma_{log}^{(D)}\end{pmatrix}+\begin{pmatrix}1\\1\\1\end{pmatrix}=0 \qquad (14)$$

$$\begin{pmatrix}G_{log}^{(\Delta)} & D_{log}^{(\Delta)} & \varphi_{log}^{(\Delta)} & \Sigma_{log}^{(\Delta)}\\G_{log}^{(d)} & D_{log}^{(d)} & \varphi_{log}^{(d)} & \Sigma_{log}^{(d)}\\G_{log}^{(D)} & D_{log}^{(D)} & \varphi_{log}^{(D)} & \Sigma_{log}^{(D)}\end{pmatrix}\cdot\begin{pmatrix}g\\d\\f\\s\end{pmatrix}=-\begin{pmatrix}1\\1\\1\end{pmatrix} \qquad (15)$$

which can be solved as:

$$\begin{pmatrix}g\\d\\f\\s\end{pmatrix}=-Q\cdot\begin{pmatrix}1\\1\\1\end{pmatrix} \qquad (16)$$

where:

$$Q=({}^T Meas_{G,D,\varphi,\Sigma}\cdot Meas_{G,D,\varphi,\Sigma})^{inv}\cdot{}^T Meas_{G,D,\varphi,\Sigma} \qquad (17)$$

and $$Meas_{G,D,\varphi,\Sigma}=\begin{pmatrix}G_{log}^{(\Delta)} & D_{log}^{(\Delta)} & \varphi_{log}^{(\Delta)} & \Sigma_{log}^{(\Delta)}\\G_{log}^{(d)} & D_{log}^{(d)} & \varphi_{log}^{(d)} & \Sigma_{log}^{(d)}\\G_{log}^{(D)} & D_{log}^{(D)} & \varphi_{log}^{(D)} & \Sigma_{log}^{(D)}\end{pmatrix} \qquad (18)$$

Having determined the EOS, next we solve for the water salinity, by solving for that water salinity that satisfies the EOS as:

$$gG_w(\text{Salinity})+dD_w(\text{Salinity})+f\varphi_w(\text{Salinity})+s\Sigma_w(\text{Salinity})+1=0 \qquad (19)$$

After having determined the water "Salinity", and consequently $G_w$(Salinity), $D_w$(Salinity), $\varphi_w$ (Salinity), and $\Sigma_w$ (Salinity), we can then determine the uncertainty on this water "Salinity", for example, due to the intrinsic measurement errors. These errors can translate into different g, d, f, and s parameters, which in turn result in different water "Salinity".

In accordance with one embodiment, a technique for determining such uncertainties may include performing a differential analysis as follows:

$$\partial elta\left\{Meas_{G,D,\varphi,\Sigma}\cdot\begin{pmatrix}g\\d\\f\\s\end{pmatrix}+\begin{pmatrix}1\\1\\1\end{pmatrix}=0\right\} \qquad (20)$$

$$Meas_{\partial G,\partial D,\partial\varphi,\partial\Sigma}\cdot\begin{pmatrix}g\\d\\f\\s\end{pmatrix}+Meas_{G,D,\varphi,\Sigma}\cdot\begin{pmatrix}\partial elta(g)\\\partial elta(d)\\\partial elta(f)\\\partial elta(s)\end{pmatrix}=0 \qquad (21)$$

where:

$$Meas_{\partial G,\partial D,\partial\varphi,\partial\Sigma}= \qquad (22)$$
$$\begin{pmatrix}\partial elta(G_{log}^{(\Delta)}) & \partial elta(D_{log}^{(\Delta)}) & \partial elta(\varphi_{log}^{(\Delta)}) & \partial elta(\Sigma_{log}^{(\Delta)})\\\partial elta(G_{log}^{(d)}) & \partial elta(D_{log}^{(d)}) & \partial elta(\varphi_{log}^{(d)}) & \partial elta(\Sigma_{log}^{(d)})\\\partial elta(G_{log}^{(D)}) & \partial elta(D_{log}^{(D)}) & \partial elta(\varphi_{log}^{(D)}) & \partial elta(\Sigma_{log}^{(D)})\end{pmatrix}$$

which can be further expressed as:

-continued $$Meas_{G,D,\varphi,\Sigma} \cdot \begin{pmatrix} \partial elta(g) \\ \partial elta(d) \\ \partial elta(f) \\ \partial elta(s) \end{pmatrix} = Meas_{\partial G,\partial D,\partial \varphi,\partial \Sigma} \cdot \begin{pmatrix} -g \\ -d \\ -f \\ -s \end{pmatrix} \quad (23)$$

such that:

$$\begin{pmatrix} \partial elta(g) \\ \partial elta(d) \\ \partial elta(f) \\ \partial elta(s) \end{pmatrix} = Q \cdot Meas_{\partial G,\partial D,\partial \varphi,\partial \Sigma} \cdot \begin{pmatrix} -g \\ -d \\ -f \\ -s \end{pmatrix} \quad (24)$$

Based on the results obtained above, when we now go back and differentiate:

$$\partial elta\{gG_w(\text{Salinity}) + dD_w(\text{Salinity}) + f\varphi_w(\text{Salinity}) + s\Sigma_w(\text{Salinity}) + 1 = 0\} \quad (25)$$

it results in the suite of the following equivalent expressions:

$$T\begin{pmatrix} \partial elta(g) \\ \partial elta(d) \\ \partial elta(f) \\ \partial elta(s) \end{pmatrix} \cdot \begin{pmatrix} G_W(\text{Salinity}) \\ D_W(\text{Salinity}) \\ \varphi_W(\text{Salinity}) \\ \Sigma_W(\text{Salinity}) \end{pmatrix} =$$

$$T\begin{pmatrix} G_W(\text{Salinity}) \\ D_W(\text{Salinity}) \\ \varphi_W(\text{Salinity}) \\ \Sigma_W(\text{Salinity}) \end{pmatrix} \cdot \begin{pmatrix} \partial elta(g) \\ \partial elta(d) \\ \partial elta(f) \\ \partial elta(s) \end{pmatrix} = -T\begin{pmatrix} g \\ d \\ f \\ s \end{pmatrix} \cdot \begin{pmatrix} G'_W(\text{Salinity}) \\ D'_W(\text{Salinity}) \\ \varphi'_W(\text{Salinity}) \\ \Sigma'_W(\text{Salinity}) \end{pmatrix} \cdot \partial elta(\text{Salinity}) =$$

$$-T\begin{pmatrix} G'_W(\text{Salinity}) \\ D'_W(\text{Salinity}) \\ \varphi'_W(\text{Salinity}) \\ \Sigma'_W(\text{Salinity}) \end{pmatrix} \cdot \begin{pmatrix} g \\ d \\ f \\ s \end{pmatrix} \cdot \partial elta(\text{Salinity})$$

where:

$$\begin{pmatrix} G'_W(\text{Salinity}) \\ D'_W(\text{Salinity}) \\ \varphi'_W(\text{Salinity}) \\ \Sigma'_W(\text{Salinity}) \end{pmatrix} = \frac{\partial}{\partial \text{Salinity}} \begin{pmatrix} G_W(\text{Salinity}) \\ D_W(\text{Salinity}) \\ \varphi_W(\text{Salinity}) \\ \Sigma_W(\text{Salinity}) \end{pmatrix}$$

When the two left-most expressions above are multiplied among each other and the two right-most expressions are multiplied among each other, the equations above simplify as:

$$T\begin{pmatrix} G_W(\text{Salinity}) \\ D_W(\text{Salinity}) \\ \varphi_W(\text{Salinity}) \\ \Sigma_W(\text{Salinity}) \end{pmatrix} \cdot \begin{pmatrix} \partial elta(g) \\ \partial elta(d) \\ \partial elta(f) \\ \partial elta(s) \end{pmatrix} \cdot T\begin{pmatrix} \partial elta(g) \\ \partial elta(d) \\ \partial elta(f) \\ \partial elta(s) \end{pmatrix} \cdot \begin{pmatrix} G_W(\text{Salinity}) \\ D_W(\text{Salinity}) \\ \varphi_W(\text{Salinity}) \\ \Sigma_W(\text{Salinity}) \end{pmatrix} =$$

$$T\begin{pmatrix} G'_W(\text{Salinity}) \\ D'_W(\text{Salinity}) \\ \varphi'_W(\text{Salinity}) \\ \Sigma'_W(\text{Salinity}) \end{pmatrix} \cdot \begin{pmatrix} g \\ d \\ f \\ s \end{pmatrix} \cdot T\begin{pmatrix} g \\ d \\ f \\ s \end{pmatrix} \cdot \begin{pmatrix} G'_W(\text{Salinity}) \\ D'_W(\text{Salinity}) \\ \varphi'_W(\text{Salinity}) \\ \Sigma'_W(\text{Salinity}) \end{pmatrix} \cdot \partial elta^2(\text{Salinity})$$

and $$\partial elta^2(\text{Salinity}) = \quad \text{(Equation 26)}$$

$$\frac{T\begin{pmatrix} G_W(\text{Salinity}) \\ D_W(\text{Salinity}) \\ \varphi_W(\text{Salinity}) \\ \Sigma_W(\text{Salinity}) \end{pmatrix} \cdot \begin{pmatrix} \partial elta(g) \\ \partial elta(d) \\ \partial elta(f) \\ \partial elta(s) \end{pmatrix} \cdot T\begin{pmatrix} \partial elta(g) \\ \partial elta(d) \\ \partial elta(f) \\ \partial elta(s) \end{pmatrix} \cdot \begin{pmatrix} G_W(\text{Salinity}) \\ D_W(\text{Salinity}) \\ \varphi_W(\text{Salinity}) \\ \Sigma_W(\text{Salinity}) \end{pmatrix}}{T\begin{pmatrix} G'_W(\text{Salinity}) \\ D'_W(\text{Salinity}) \\ \varphi'_W(\text{Salinity}) \\ \Sigma'_W(\text{Salinity}) \end{pmatrix} \cdot \begin{pmatrix} g \\ d \\ f \\ s \end{pmatrix} \cdot T\begin{pmatrix} g \\ d \\ f \\ s \end{pmatrix} \cdot \begin{pmatrix} G'_W(\text{Salinity}) \\ D'_W(\text{Salinity}) \\ \varphi'_W(\text{Salinity}) \\ \Sigma'_W(\text{Salinity}) \end{pmatrix}}$$

Because g, d, f and s have already been computed, the denominator is already known in Equation 26 above. The numerator is further simplified by taking advantage of the fact that intrinsic instrument measurement errors between any two different measurements or any two different depths are generally uncorrelated. Thus:

$$\begin{pmatrix} \partial elta(g) \\ \partial elta(d) \\ \partial elta(f) \\ \partial elta(s) \end{pmatrix} \cdot T\begin{pmatrix} \partial elta(g) \\ \partial elta(d) \\ \partial elta(f) \\ \partial elta(s) \end{pmatrix} =$$

$$Q \cdot Meas_{\partial G,\partial D,\partial \varphi,\partial \Sigma} \cdot \begin{pmatrix} g \\ d \\ f \\ s \end{pmatrix} \cdot T\begin{pmatrix} g \\ d \\ f \\ s \end{pmatrix} \cdot T Meas_{\partial G,\partial D,\partial \varphi,\partial \Sigma} \cdot T Q =$$

$$(Q^T Q) \cdot (g^2 \ \partial elta^2(G) + d^2 \ \partial elta^2(D) + f^2 \ \partial elta^2(\varphi) + s^2 \ elta^2(\Sigma)) =$$

$$\{Q^T Q\} \cdot (g^2 + r^2 + f^2 + s^2)$$

where Q is already known, and $\sqrt{\partial elta^2(G)}$, $\sqrt{\partial elta^2(D)}$, $\sqrt{\partial elta^2(\varphi)}$, $\sqrt{\partial elta^2(\Sigma)}$ are the natural gamma-ray (G), bulk density (D), neutron porosity (y), and thermal-neutron capture cross-section ($\Sigma$) measurement instruments' errors. These errors are equal to 1, based on the earlier statement, that various measurements were construed to have been normalized by the intrinsic error of the respective measurement instruments used.

The Salinity uncertainty can then be determined as:

$$\text{Salinity}_{unc} = \sqrt{\partial elta^2(\text{Salinity})}$$

$$\text{Salinity}_{unc} = \sqrt{\frac{T\begin{pmatrix} g \\ r \\ f \\ s \end{pmatrix} \cdot \begin{pmatrix} g \\ r \\ f \\ s \end{pmatrix} \cdot T\begin{pmatrix} G_W(\text{Salinity}) \\ D_W(\text{Salinity}) \\ \varphi_W(\text{Salinity}) \\ \Sigma_W(\text{Salinity}) \end{pmatrix} \cdot (Q^T Q) \cdot \begin{pmatrix} G_W(\text{Salinity}) \\ D_W(\text{Salinity}) \\ \varphi_W(\text{Salinity}) \\ \Sigma_W(\text{Salinity}) \end{pmatrix}}{T\begin{pmatrix} G'_W(\text{Salinity}) \\ D'_W(\text{Salinity}) \\ \varphi'_W(\text{Salinity}) \\ \Sigma'_W(\text{Salinity}) \end{pmatrix} \cdot \begin{pmatrix} g \\ r \\ f \\ s \end{pmatrix} \cdot T\begin{pmatrix} g \\ r \\ f \\ s \end{pmatrix} \cdot \begin{pmatrix} G'_W(\text{Salinity}) \\ D'_W(\text{Salinity}) \\ \varphi'_W(\text{Salinity}) \\ \Sigma'_W(\text{Salinity}) \end{pmatrix}}}$$

Referring to the example shown in FIG. 11 above, the EOSqf was taken to be $$EOSqf = \frac{3 \times \{\text{Average distance of } \vec{M}^{(d)} \text{ to the } EOS \text{ plane, under ideal conditions}\}}{\underset{\text{All depths } \Delta \leq d \leq D}{\text{MAX}}\{\text{Distance of } \vec{M}^{(d)} \text{ to the } EOS \text{ plane}\}}$$

As can be appreciated, more elaborate versions of the EOSqf are possible that take into account the rank of the measurements correlation matrix.

As will be understood, the various techniques described above and relating to formation evaluation via determination of formation volumetric information are provided as example embodiments. Accordingly, it should be understood that the present disclosure should not be construed as being limited to only the examples provided above. Further, it should be appreciated that the techniques disclosed herein may be implemented in any suitable manner, including hardware (suitably configured circuitry), software (e.g., via a computer program including executable code stored on one or more tangible computer readable medium), or via using a combination of both hardware and software elements. Further, it is understood that the various formation volumetric techniques described may be implemented on a downhole processor (e.g., a processor that is part of a logging tool), such that the resulting volumetric information is sent to the surface by any suitable telemetry technique. Additionally, in other embodiments, log measurements may be transmitted uphole via telemetry, and the determination of formation volumetric information may be performed uphole on a surface computer (e.g., part of control system 152 in FIG. 1).

While the specific embodiments described above have been shown by way of example, it will be appreciated that many modifications and other embodiments will come to the mind of one skilled in the art having the benefit of the teachings presented in the foregoing description and the associated drawings. Accordingly, it is understood that various modifications and embodiments are intended to be included within the scope of the appended claims.

That which is claimed is:

1. A method for controlling drilling by determining a volume of at least one constituent in a geological formation comprising:
   acquiring log measurements during the drilling of the geological formation using at least one logging tool;
   generating an equation of state based upon log measurements for the geological formation, the equation of state providing a correlation between the log measurements;
   determining a quality factor for the equation of state;
   for each of a plurality of different constituents expected to be in the geological formation, determining a constituent compliance factor for each of the constituents;
   determining an uncertainty for each constituent compliance factor;
   determining a likelihood that each constituent is present in the geological formation based upon the quality factor, the constituent compliance factor for the constituent, and the uncertainty for the constituent compliance factor;
   generating a volumetric model based upon the log measurements and the determined likelihoods of the constituents being present in the geological formation;
   determining the volume of the at least one constituent based upon the volumetric model; and
   controlling the drilling of the geological formation based at least in part on the volume of the at least one constituent.

2. The method of claim 1 further comprising obtaining the log measurements based upon a plurality of different types of log measurements.

3. The method of claim 1 wherein the log measurements comprise at least one of nuclear log measurements, NMR log measurements, acoustic log measurements, electromagnetic log measurements, and resistivity log measurements.

4. The method of claim 1 wherein the log measurements comprise at least one of natural gamma-ray measurements, bulk density measurements, neutron porosity measurements, and thermal-neutron capture cross-section measurements.

5. The method of claim 1 wherein determining the volume comprises determining a volumetric composition of the geological formation including volumes of the plurality of different constituents.

6. The method of claim 1 wherein the plurality of different constituents comprises mineral and fluid constituents.

7. The method of claim 1 wherein the uncertainty for each constituent compliance factor is based upon an intrinsic error associated with at least one logging tool used to acquire the log measurements.

8. The method of claim 1 further comprising identifying and repairing a stray log measurement.

9. The method of claim 8 wherein repairing the stray log measurement comprises updating the equation of state based upon log measurement calibration parameters.

10. The method of claim 1 wherein determining the volume comprises converting the log measurements to a volumetric fraction for the at least one constituent.

11. A control system comprising:
    at least one logging tool to collect log measurements for a geological formation during drilling of the geological formation; and
    a processor to
      generate an equation of state based upon the log measurements, the equation of state providing a correlation between the log measurements,
      determine a quality factor for the equation of state, for each of a plurality of different constituents expected to be in the geological formation,
      determine a constituent compliance factor for each of the constituents,
      determine an uncertainty for each constituent compliance factor,
      determine a likelihood that each constituent is present in the geological formation based upon the quality factor, the constituent compliance factor for the constituent, and the uncertainty for the constituent compliance factor,
      generate a volumetric model based upon the log measurements and the determined likelihoods of the constituents being present in the geological formation, and
      determine the volume of at least one constituent based upon the model, and
      control the drilling of the geological formation based at least in part on the volume of the at least one constituent.

12. The system of claim 11 wherein the at least one logging tool comprises a plurality of different types of well logging tools.

13. The system of claim 11 wherein the log measurements comprise at least one of nuclear log measurements, NMR log measurements, acoustic log measurements, electromagnetic log measurements, and resistivity log measurements.

14. The system of claim 11 wherein the log measurements comprise at least one of natural gamma-ray measurements, bulk density measurements, neutron porosity measurements, and thermal-neutron capture cross-section measurements.

15. The system of claim 11 wherein said processor determines a volumetric composition of the geological formation including volumes of the plurality of different constituents.

16. The system of claim 11 wherein the plurality of different constituents comprises mineral and fluid constituents.

17. The system of claim 11 wherein the uncertainty for each constituent compliance factor is based upon an intrinsic error associated with at least one logging tool used to acquire the log measurements.

18. The system of claim 11 wherein said logging tool comprises a logging while drilling (LWD) tool.

19. The system of claim 11 wherein the logging tool is conveyed by at least one of a slickline, wireline, coil tubing, and drill pipe.

20. A non-transitory computer-readable medium having computer-executable instructions for causing a computer to at least:
acquire log measurements for a geologic formation during drilling of the geologic formation using at least one logging tool;
generate an equation of state based upon the log measurements, the equation of state providing a correlation between the log measurements;
determine a quality factor for the equation of state;
for each of a plurality of different constituents expected to be in the geological formation, determine a constituent compliance factor for each of the constituents;
determine an uncertainty for each constituent compliance factor;
determine a likelihood that each constituent is present in the geological formation based upon the quality factor, the constituent compliance factor for the constituent, and the uncertainty for the constituent compliance factor;
generate a volumetric model based upon the log measurements and the determined likelihoods of the constituents being present in the geological formation;
determine the volume of at least one constituent based upon the model; and
control the drilling of the geological formation based at least in part on the volume of the at least one constituent.

21. The non-transitory computer-readable medium of claim 20 wherein the log measurements are based upon a plurality of different types of log measurements.

22. The non-transitory computer-readable medium of claim 20 wherein the log measurements comprise at least one of nuclear log measurements, NMR log measurements, acoustic log measurements, electromagnetic log measurements, and resistivity log measurements.

23. The non-transitory computer-readable medium of claim 20 wherein the log measurements comprise at least one of natural gamma-ray measurements, bulk density measurements, neutron porosity measurements, and thermal-neutron capture cross-section measurements.

24. The non-transitory computer-readable medium of claim 20 wherein determining the volume comprises determining a volumetric composition of the geological formation including volumes of the plurality of different constituents.

25. A method for controlling drilling by determining hydrocarbon fluid type in a water wet formation comprising:
acquiring log measurements during the drilling using at least one logging tool;
generating an equation of state based upon the log measurements wherein the log measurements comprise NMR log measurements, and at least one of dielectric, sigma thermal neutron capture cross-section (E) or carbon/oxygen (C/O) measurements;
determining the aggregate NMR distribution underpinning water and hydrocarbon fluid NMR distributions, based on the generated equation of state;
determining the hydrocarbon fluid viscosity and type, based upon the shape of the determined hydrocarbon fluid NMR distribution; and
controlling the drilling based at least in part on the hydrocarbon fluid type.

26. A method for controlling drilling by determining formation wettability:
acquiring log measurements during the drilling using at least one logging tool;
generating an equation of state based upon the log measurements wherein the log measurements comprise NMR log measurements, and at least one of dielectric, sigma thermal neutron capture cross-section (E) or carbon/oxygen (C/O) measurements;
determining the aggregate NMR distribution underpinning water and hydrocarbon fluid NMR distributions, based on the generated equation of state;
comparing the shape of the determined water and hydrocarbon fluid NMR distributions, with the respective water and hydrocarbon fluid reference bulk NMR distributions, for known hydrocarbon type;
determining the formation wettability, based upon the comparison; and
controlling the drilling based at least in part on the formation wettability.

* * * * *